United States Patent [19]
Pivonka

[11] Patent Number: 6,014,835
[45] Date of Patent: Jan. 18, 2000

[54] TRAILER MOUNTED FLAME CULTIVATOR HAVING RESILIENTLY YIELDABLE BOOM ARM ASSEMBLY

[76] Inventor: Ralph M. Pivonka, 915 Maple, LaCrosse, Kans. 67548

[21] Appl. No.: 09/052,739

[22] Filed: Mar. 31, 1998

[51] Int. Cl.[7] .................................................. A01M 15/00
[52] U.S. Cl. ........................................................ 47/1.44
[58] Field of Search ............................ 47/1.44, 1.5, 1.7; 56/15.2, 12.7, 10.4, 11.9; 239/664, 159; 267/177; 29/227; 198/313

[56] References Cited

U.S. PATENT DOCUMENTS

| | | | |
|---|---|---|---|
| 533,577 | 2/1895 | Ainger | 47/1.44 |
| 1,799,035 | 3/1931 | Benien et al. | 47/1.44 |
| 2,454,365 | 11/1948 | Woolery | 47/1.44 |
| 2,494,720 | 1/1950 | Richards | 47/1.44 |
| 2,531,741 | 11/1950 | Peck | 47/1.44 |
| 2,542,498 | 2/1951 | Forbes | 47/1.44 |
| 3,164,927 | 1/1965 | Holloway | 47/1.44 |
| 3,177,922 | 4/1965 | Pardee | 431/243 |
| 3,215,186 | 11/1965 | Levitt | 431/126 |
| 3,357,474 | 12/1967 | Pivonka | 431/240 |
| 3,404,676 | 10/1968 | Walker et al. | 126/271.2 R |
| 3,407,804 | 10/1968 | Walker et al. | 126/271.2 R |
| 3,477,174 | 11/1969 | Lalor | 47/1.44 |
| 3,486,497 | 12/1969 | Pivonka | 126/271.2 R |
| 3,554,478 | 1/1971 | Sunderman | 248/278 |
| 3,727,346 | 4/1973 | Kramer | 47/1.44 |
| 3,744,719 | 7/1973 | Wallick | 239/199 |
| 3,866,834 | 2/1975 | Shannon | 47/1.44 |
| 3,983,944 | 10/1976 | Farrant | 172/314 |
| 4,050,596 | 9/1977 | Zeuner et al. | 214/131 |
| 4,121,774 | 10/1978 | Van Der Lely et al. | 239/664 |
| 4,183,195 | 1/1980 | James | 56/11.9 |
| 4,298,069 | 11/1981 | Van Der Lely | 172/59 |
| 4,526,236 | 7/1985 | Jacobsen | 172/126 |
| 4,875,526 | 10/1989 | Latino et al. | 169/24 |
| 4,884,780 | 12/1989 | Ohashi | 251/11 |
| 4,887,417 | 12/1989 | Parsons, Jr. | 56/15.2 |
| 4,976,416 | 12/1990 | Klann | 267/177 |
| 5,012,608 | 5/1991 | Brown | 47/1.7 |
| 5,020,510 | 6/1991 | Jones | 126/271.1 |
| 5,030,086 | 7/1991 | Jones | 431/207 |
| 5,065,566 | 11/1991 | Gates | 56/12.7 |
| 5,396,754 | 3/1995 | Fraley | 56/15.2 |
| 5,419,367 | 5/1995 | Noya | 137/495 |
| 5,575,272 | 11/1996 | Byrne | 126/343.5 |
| 5,741,090 | 4/1998 | Dunning et al. | 405/263 |
| 5,826,371 | 10/1998 | Benjamin | 47/1.44 |
| 5,848,492 | 12/1998 | Brown | 47/1.44 |

FOREIGN PATENT DOCUMENTS

| | | | |
|---|---|---|---|
| 129211 | 9/1948 | Australia | 47/1.44 |
| 2235637 | 1/1975 | France | 47/1.44 |
| 002673355A1 | 9/1992 | France . | |

OTHER PUBLICATIONS

Syracuse Sunday Post Standard, Gravure section, p. 6. Aug. 1948.

Mississippi State College, Agricultural Experiment Station, "Control of Weeds and Grasses In Cotton by Flaming", circular 118 all pages. Mar. 1944.

Mississippi State College, Agricultural Experiment Station, "Mechanical Production of Cotton", Bulletin 423, all pages. Sep. 1945.

Louisiana State University, Agricultural and Mechanical College, "Flame Cultivation" Louisiana Bulletin 415, all pages. Apr. 1947.

Primary Examiner—Thomas Price
Assistant Examiner—Fredrick T. French, III
Attorney, Agent, or Firm—Henderson & Sturm

[57] ABSTRACT

A trailer mounted flame cultivator adapted to be towed by a small vehicle such as a garden tractor or an all-terrain-vehicle (ATV). The wheeled trailer supports a fuel tank and boom arms that carry torch assemblies at their distal ends. Control valves are interposed in the fuel line connecting the fuel tank and the torch assemblies. A control panel mounted on the towing vehicle conveniently accessible to the operator is electrically connected to the control valves. Manipulation of the control panel by the operator selectively activates the torch assemblies.

9 Claims, 6 Drawing Sheets

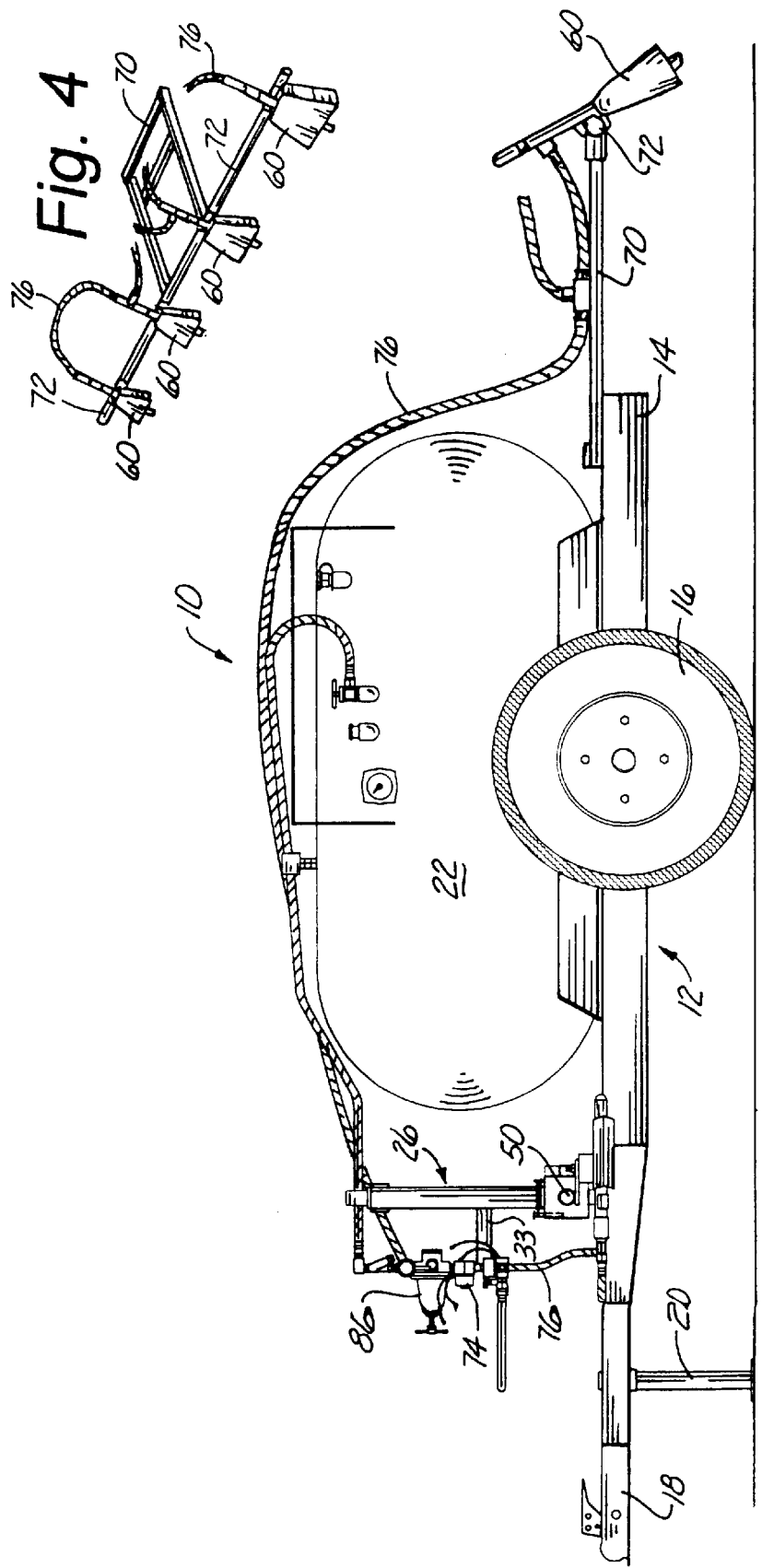

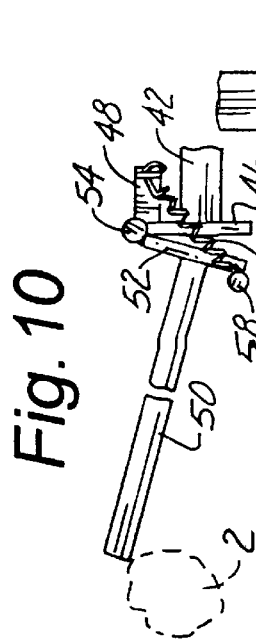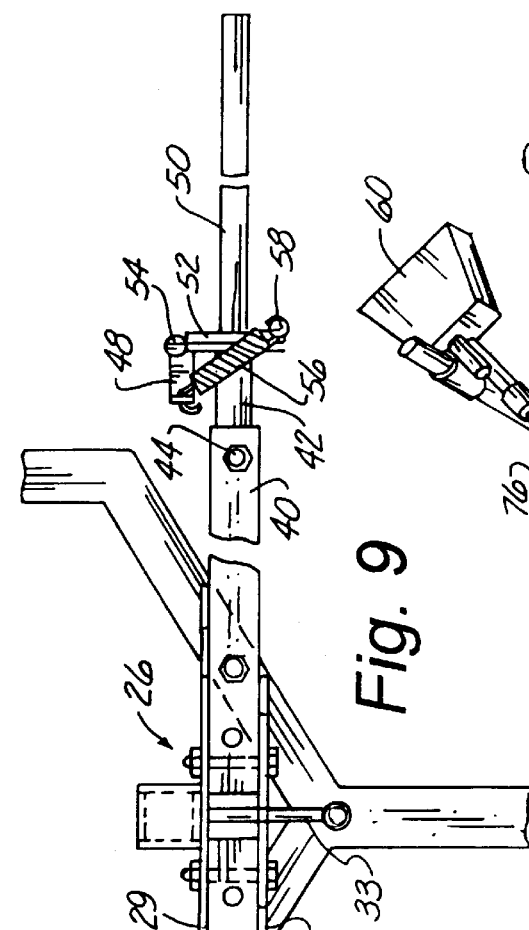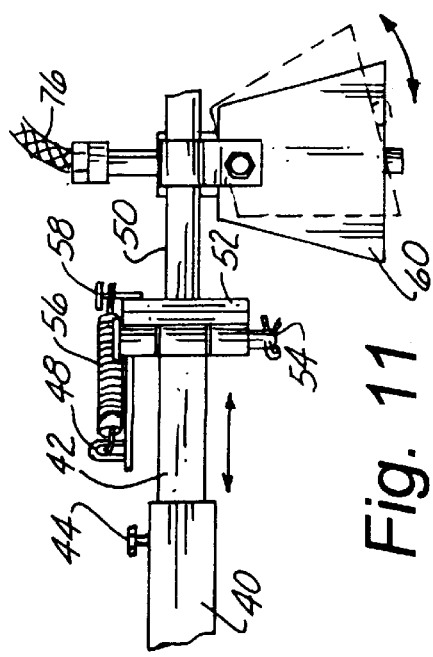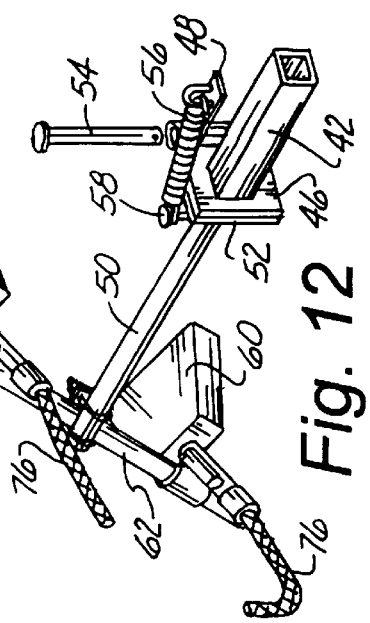

TRAILER MOUNTED FLAME CULTIVATOR HAVING RESILIENTLY YIELDABLE BOOM ARM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to the field of flame cultivation of commercial crops, and more particularly to a trailer mounted compact flamer adapted for use in areas of limited access such as vineyards and orchards.

2. Description of the Related Art

As can be seen by reference to the following U.S. Pat. Nos. 5,030,086; 3,727,346; 3,486,497; 3,407,804; 3,404,676; 3,357,474; 3,215,186; 3,177,922; and 3,164,927 the prior art is replete with myriad and diverse flame cultivators.

While all of the aforementioned prior art constructions are more than adequate for the basic purpose and function for which they have been specifically designed, they are uniformly deficient with respect to their failure to provide a simple, efficient and practical mechanized flame cultivator adapted to use in hard-to-reach areas such as vineyards and orchards where a canopy often forms over adjacent growing rows.

As a consequence of the foregoing situation, there has existed a longstanding need for a new and improved flame cultivator suitable for use in areas of limited access, and the provision of such a construction is a stated objective of the present invention.

BRIEF SUMMARY OF THE INVENTION

The present invention provides a trailer mounted flame cultivator adapted to be towed by a small vehicle such as a garden tractor or an all-terrain-vehicle (ATV). The wheeled trailer supports a fuel tank and boom arms that carry torch assemblies at their distal ends. Control valves are interposed in the fuel line connecting the fuel tank and the torch assemblies. A control panel mounted on the towing vehicle conveniently accessible to the operator is electrically connected to the control valves. Manipulation of the control panel by the operator selectively activates the torch assemblies.

In the preferred embodiment boom arms extend out from both sides of the trailer. The boom arms are adjustable in length to accommodate different row sizes, and they include a resiliently yieldable break-away connection that minimizes damage when the boom comes into contact with a post or tree trunk.

BRIEF DESCRIPTION OF THE SEVERAL VIEWS OF THE DRAWINGS

These and other attributes of the invention will become more clear upon a thorough study of the following description of the best mode for carrying out the invention, particularly when viewed in conjunction with the drawings, wherein:

FIG. 3 is a side elevational view of the flame cultivator including the option of a rear bracket for supporting torches to flame cultivate the alleyways between rows;

FIG. 4 is a reduced rear perspective view of the rear bracket and torches;

FIG. 9 is a top plan view, with segments foreshortened, showing the boom arms in the lowered working position;

FIG. 10 is a partial top plan view illustrating the resiliently yieldable connection of the boom arms as the boom arm contacts an obstruction;

FIG. 11 is a partial front elevational view showing one torch attachment at the end of the boom arm; and FIG. 12 is a partial front elevational view showing another torch attachment at the end of the boom arm.

DETAILED DESCRIPTION OF THE INVENTION

Figure 1:
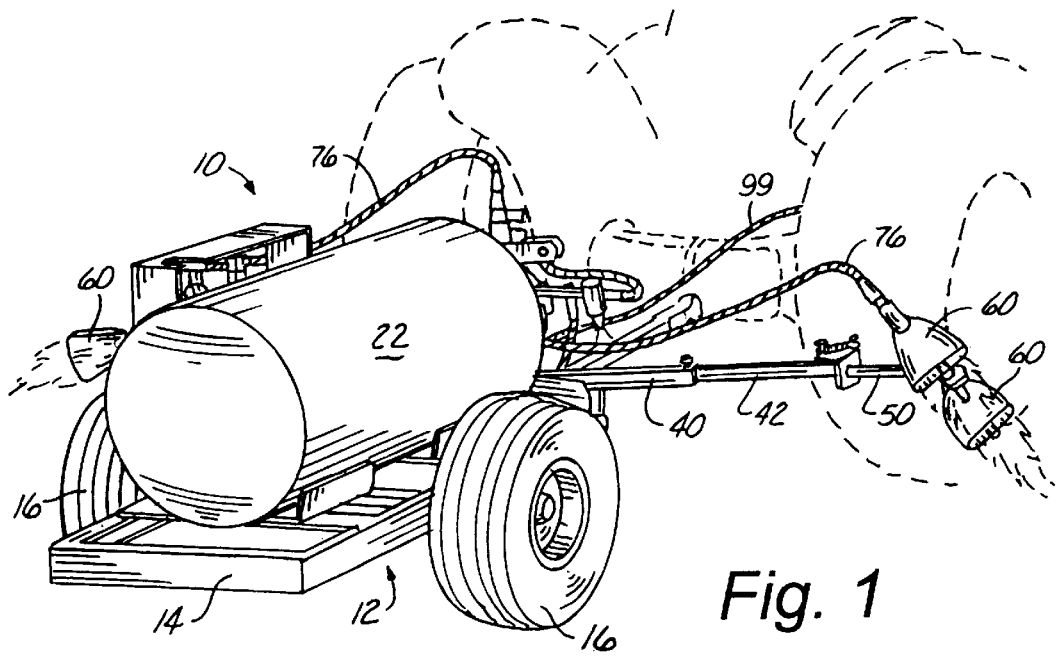
FIG. 1 is a rear perspective view of the trailer mounted flame cultivator of the present invention showing torch supporting boom arms extending to each side, and showing a towing vehicle in dashed lines.

As can be seen by reference to the drawings, wherein the reference numerals refer to corresponding parts throughout the several views, FIG. 1 shows the trailer mounted flame cultivator (10) that forms a basis for the present invention. The cultivator (10) is shown attached to a towing vehicle (1) which could be a small garden tractor or even an all-terrain-vehicle (ATV).

Figure 2:
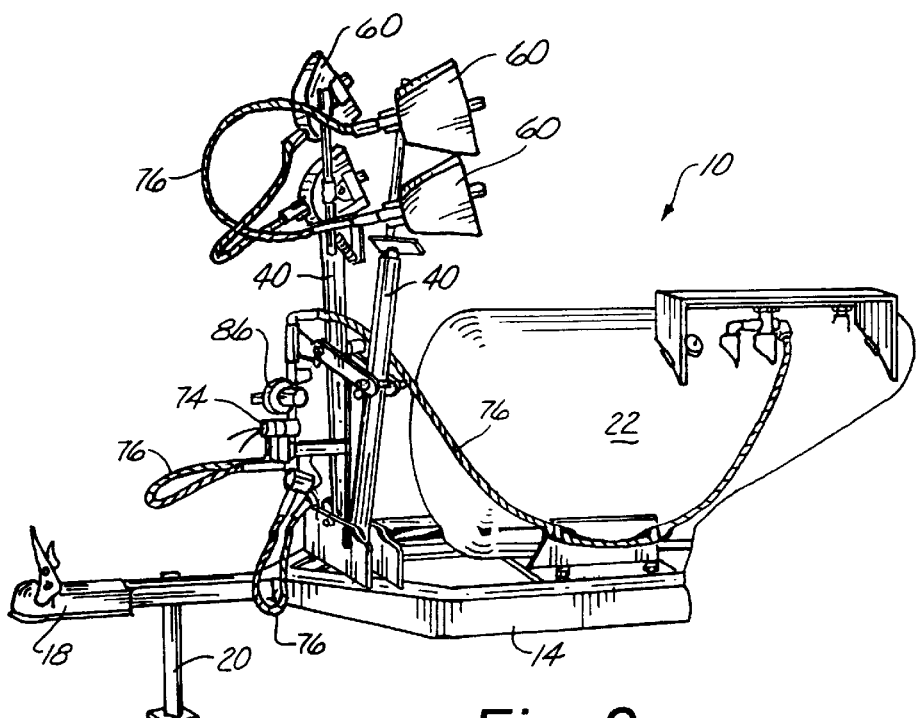
FIG. 2 is a partial side perspective view of the flame cultivator supported on a jack stand.
Figure 5:
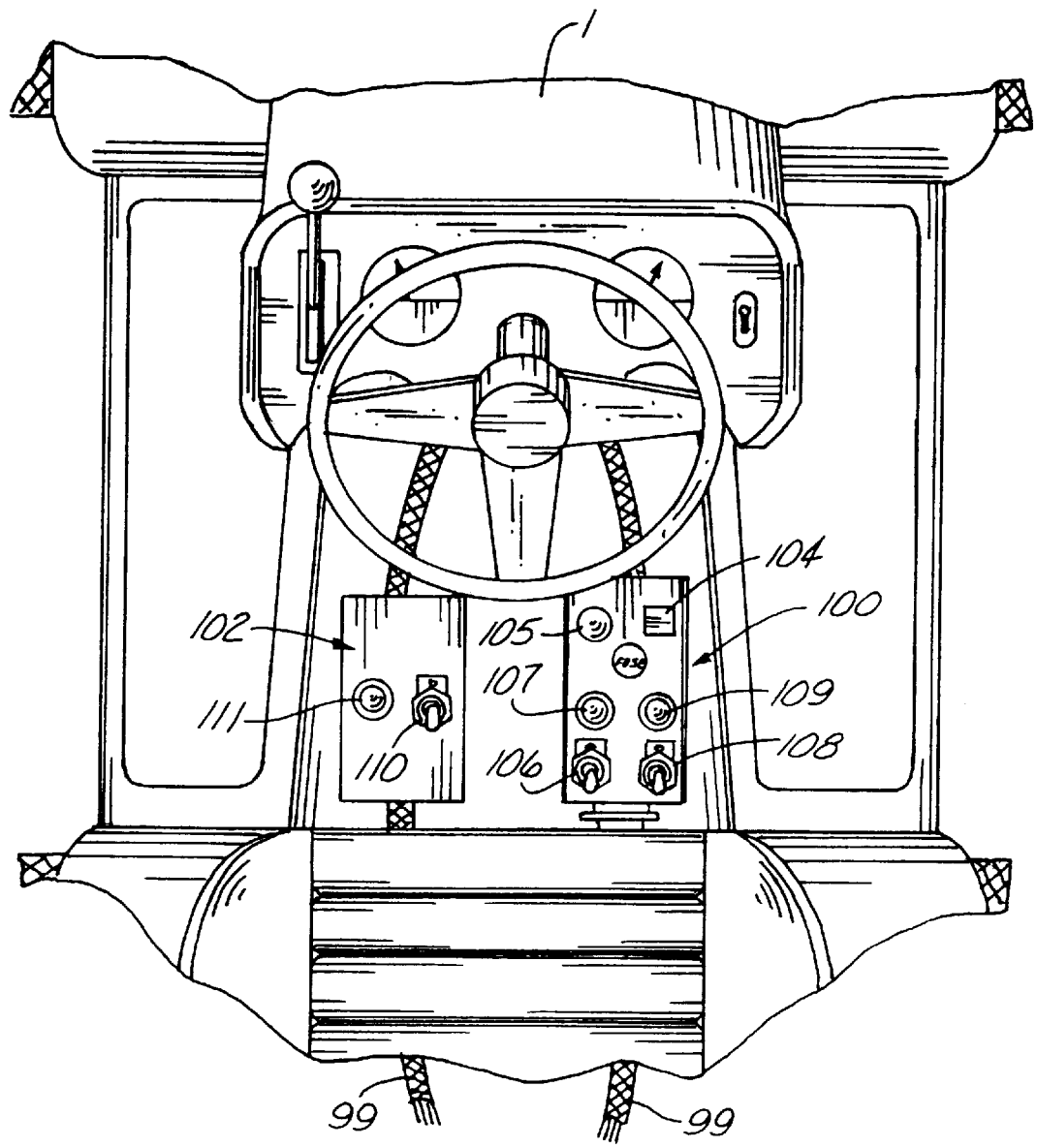
FIG. 5 is a top plan view showing controls for the side and rear torches mounted on a towing vehicle near the other operator controls for the vehicle.

As best shown in FIGS. 1–3, the cultivator (10) includes a trailer (12) having a frame (14) supported by ground wheels (16) and a forwardly extending hitch (18). A jack (20) supports the forward end of the frame (14) when the cultivator (10) is not in use. A fuel tank (22) is supported on the trailer frame (14).

Figure 8:
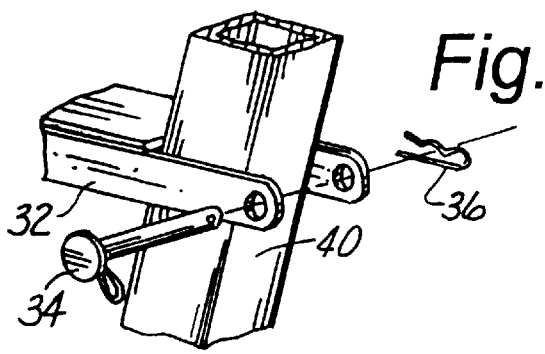
FIG. 8 is an enlarged partial exploded perspective view showing the pin that secures the boom arms in the transport position.
Figure 7:
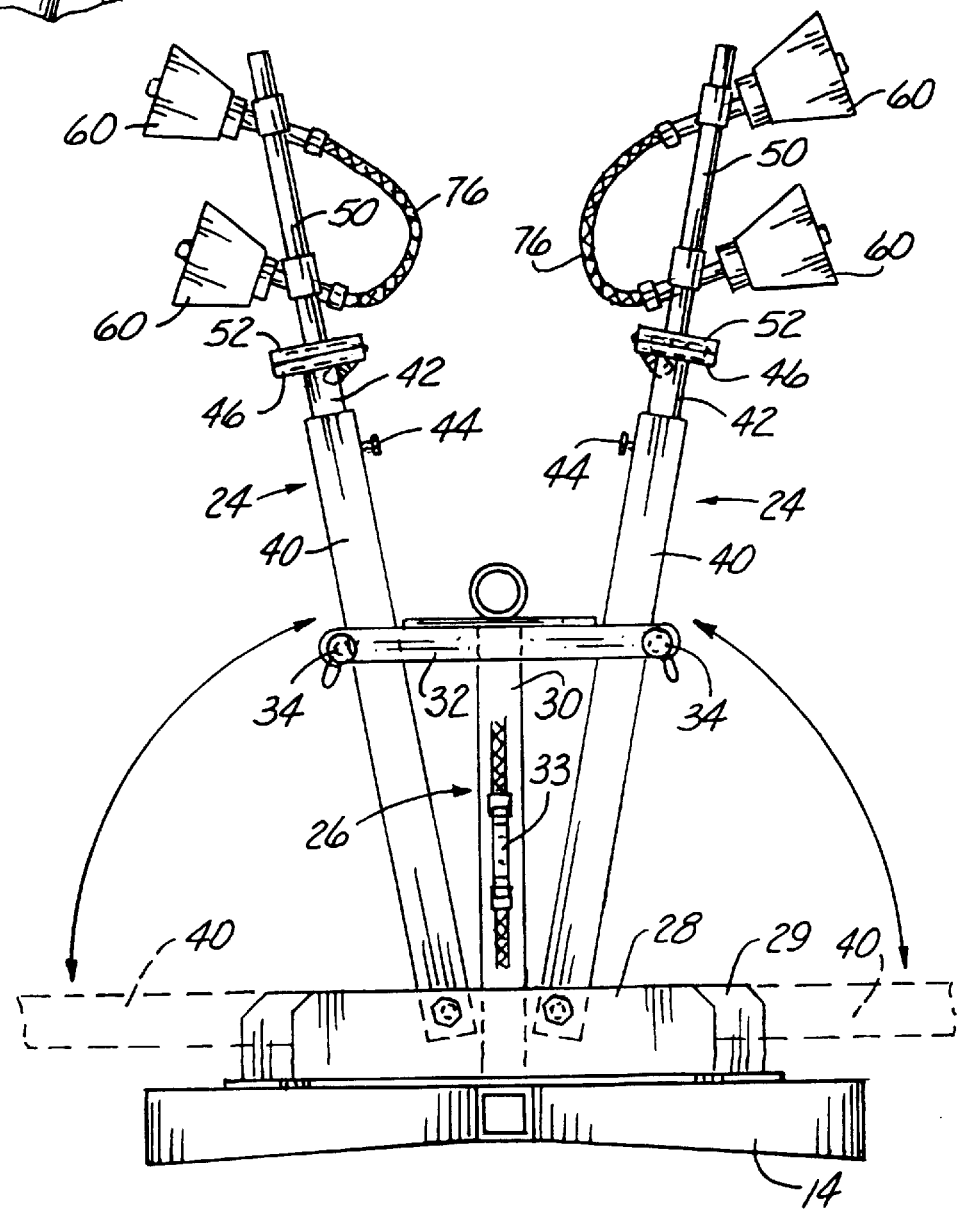
FIG. 7 is a front elevational view showing the boom arms in the transport or storage position, with a dashed line showing of the boom arms moved down to the working position.

As illustrated in FIGS. 7–12, a pair of boom arms (24) are pivotally attached to the front of the frame (14) from a bracket assembly (26). FIG. 7 shows the bracket assembly (26) having front and rear spaced horizontal base plates (28, 29), a vertical column (30), a cross bar (32) at the top of the column (30), and a forwardly extending bar and nipple (33). When the boom arms (24) are moved to the upwardly directed transport or storage position, they are secured in position by pin (34) and clip (36) (FIG. 8).

The boom arms (24) include a first large tubular member (40) and a second member (42) which is telescopically received in the first member (40). A set screw (44) secures the first and second members (40, 42) at any of a number of relative positions to allow for selective adjustment of the length of the boom arms (24). The end of the second member (42) carries a flat plate (46) having an inwardly directed tab (48). A tool bar (50), having a flat plate (52) at its inner end, is pivotally attached to the second member (42) by pivot pin (54). A spring (56) interconnects the tab (48) and a projection (58) extending from the flat plate (52) of the tool bar (50). As shown in FIG. 10, when the tool bar (50) came into contact with an obstruction (2) such as a post or a tree trunk, the tool bar (50) yields by pivoting back away from the obstruction (2). When the obstruction (2) is passed, the tool bar (50) is returned to the original position by action of the spring (56).

Torch assemblies (60) are either attached directly to the tool bar (50) as shown in FIG. 11, or they are attached to an end piece (62) which is attached at the end of the tool bar (50) as shown in FIG. 12. The torch assemblies (60) may be positioned at various orientations suitable for the crops being cultivated as illustrated in FIGS. 11 and 12. As shown in FIGS. 3 and 4, a rear bracket (70) including a tool bar (72) may be attached to the rear of the frame (14) to support torch assemblies (60) for cultivation of the alleyway between rows.

Figure 6:
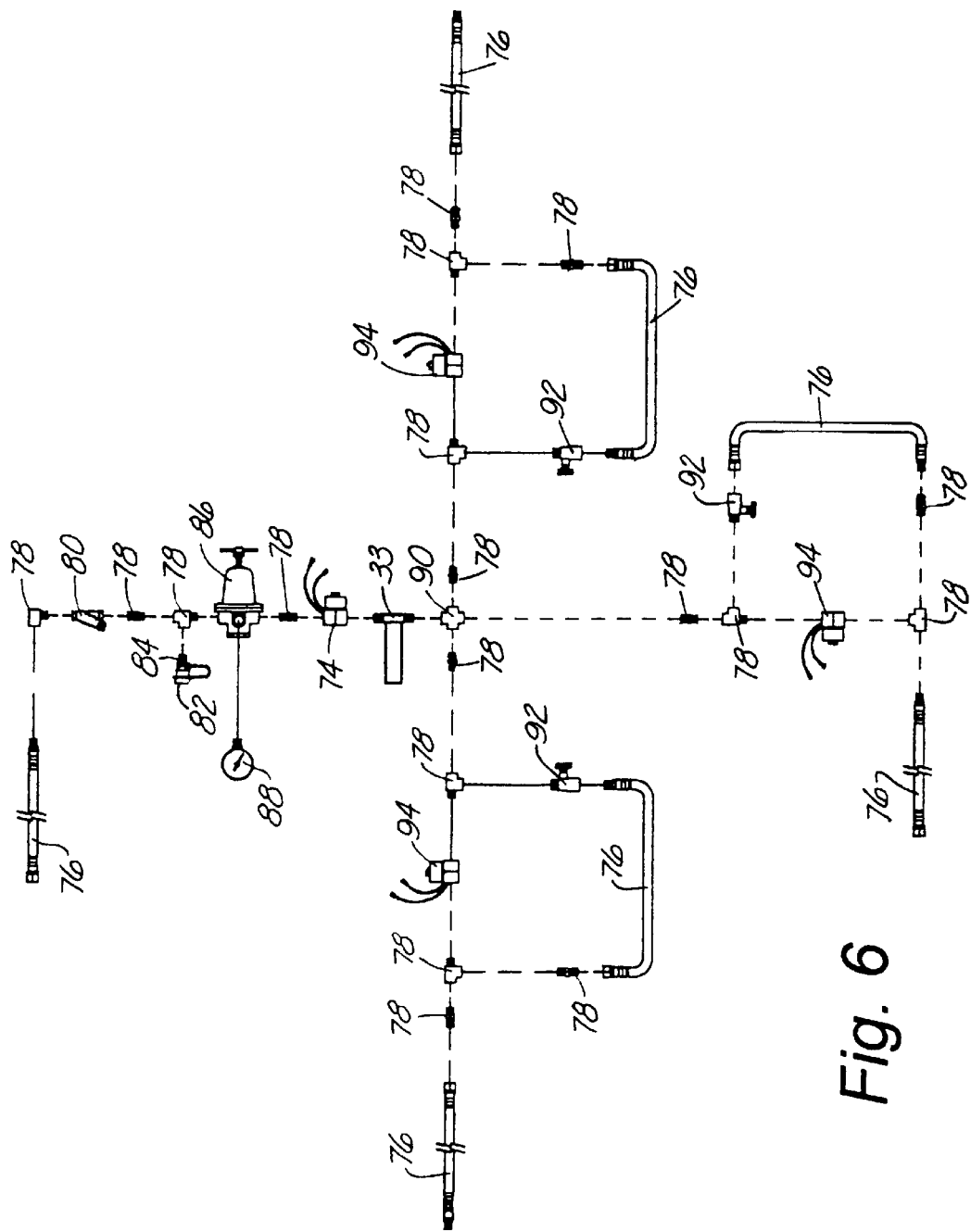
FIG. 6 is an exploded schematic showing the line connections between the fuel tank and the torches.

The torch assemblies (60) are connected to the fuel tank (22) by the fuel line connections illustrated in the schematic of FIG. 6. The top of the nipple (33) extending forward from the bracket assembly (26) receives a 12-volt solenoid (74) which controls the flow of fuel from the fuel tank through fuel line (76). Fittings (78) interconnect the fuel line (76), a fuel strainer (80), a rain cap (82), a pressure relief valve (84), a pressure regulator (86), a pressure gauge (88), and the solenoid (74). The bottom of the nipple (33) receives a brass cross (90) that feeds the torch assemblies (60) of the left and right boom arms (24) and the rear bracket (70). Each of these three circuits includes a bypass with a by-pass valve (92) and is controlled by a 12-volt solenoid (94).

The solenoids (74, 94) are electrically connected to control panels (100, 102) located on the towing vehicle (1) within easy reach of the operator. Control panel (100) includes a switch or panic button (104) that can be easily activated to shut down the entire system. Indicator light (105) shows when the system is operating. Switches (106, 108) are electrically connected to solenoids (94) for the left and right boom arms (24), and indicator lights (107, 109) indicate when these systems are operating. Control panel (102) includes a switch (110) electrically connected to the solenoid (94) for the rear flamer bracket (70). Indicator light (111) shows when the rear flamer is operating.

In operation, the boom arms (24) are lowered to their working positions, and the torch assemblies (60) are positioned for the specific cultivation task at hand. The boom sections (40, 42) are adjusted to the desired length and secured in position by tightening the set screws (44). The torch assemblies (60) on the rear bracket (70) may also be positioned as desired. The control panels (100, 102) on the towing vehicle (1) are electrically connected by wiring (99) to the solenoids (74, 94) and the appropriate valves are opened to allow fuel flow to the torch assemblies (60). The left, right and rear torch assemblies (60) may be individually controlled and operated in combination or separately, as desired. If the torch assemblies (60) on the left or right boom arm (24) come into contact with an obstruction (2), they will yield and then return to the working position by action of the spring (56).

The trailer mounted flame cultivator (10) of the present invention is especially well-suited to control weeds, grass and suckers in vineyards. The torch assemblies (60) shock the vegetation and thus reduce the need for chemicals or hand weeding. The flame cultivator is also useful in orchards and vegetable gardens for the same type of weed control.

What is claimed is:

1. A flame cultivator, comprising:
    a wheeled trailer including ground wheels attached to and supporting a frame, and a hitch extending forward of the frame to attach to a towing vehicle;
    a fuel tank supported on the frame;
    a boom arm attached to the frame and disposed to extend from a lateral side of the trailer; wherein the first boom arm includes a second boom section telescopically received into a first boom section and the first boom arm is pivotally attached to the frame; is selectively movable between an upwardly extending transport position and a laterally disposed working position, and the second boom section includes a resiliently yielding means for absorbing an impact from contact with a vertical obstruction such that one end of the second boom section will be rearwardly displaced in a horizontal plane relative to the other end of the second boom section;
    a torch assembly attached to an outer end of the first boom arm;
    a fuel line disposed to interconnect the fuel tank and the torch;
    a valve disposed within the fuel line; and
    a control mounted on the towing vehicle in proximity to a towing vehicle operator and being electrically connected to the valve, wherein the operator of the towing vehicle can selectively activate the torch from the towing vehicle.

2. The flame cultivator of claim 1 further including a second boom arm attached to the frame and disposed to extend out from a second lateral side of the trailer, and a torch assembly operable attached to an outer end of the second boom arm.

3. The flame cultivator of claim 1 further including a bracket attached to the trailer and disposed to extend out from a rear side of the trailer, and a torch assembly operably attached to the bracket.

4. The flame cultivator of claim 2 wherein the second boom arm is pivotally attached to the frame, and wherein the second boom arm is selectively movable between an upwardly extending transport position and a laterally disposed working position.

5. The flame cultivator of claim 2 wherein the second boom arm further includes means for selectively adjusting the length of the second boom arm.

6. The flame cultivator of claim 4 wherein the second boom arm further includes means for selectively adjusting the length of the second boom arm.

7. The flame cultivator of claim 5 wherein the boom length adjusting means includes a first boom section telescopically received into a second boom section.

8. The flame cultivator of claim 6 wherein the boom length adjusting means includes a first boom section telescopically received into a second boom section.

9. The flame cultivator of claim 8 wherein the outer end of the second boom arm further includes resiliently yielding means for absorbing an impact from contact with a vertical obstruction such that the second boom arm will be rearwardly displaced in a horizontal plane.

* * * * *